Sept. 12, 1939. W. HEYNER ET AL 2,172,350
SCREW CONNECTION
Filed Nov. 15, 1938
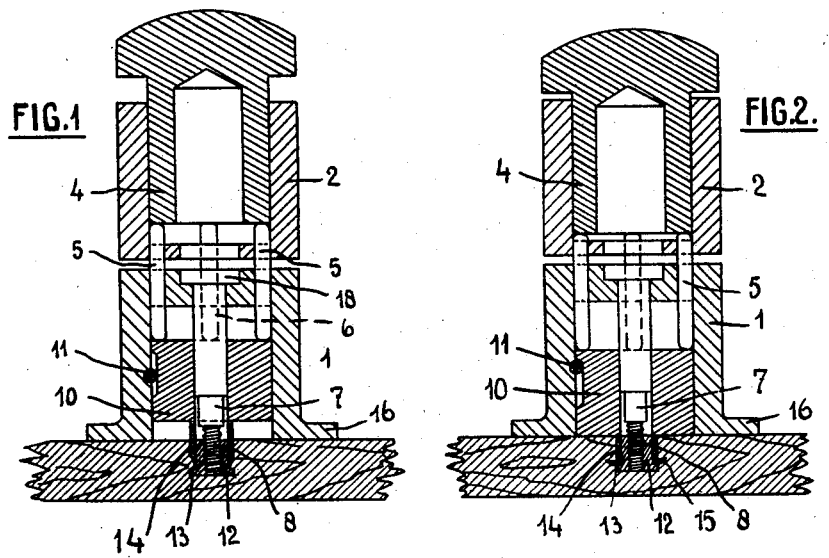
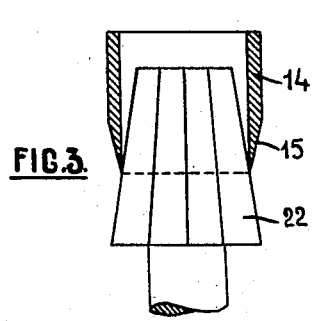
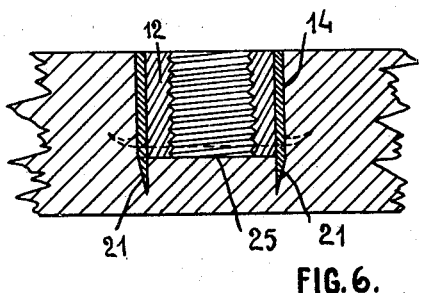
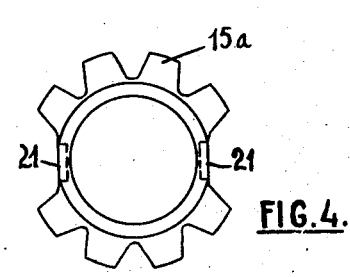
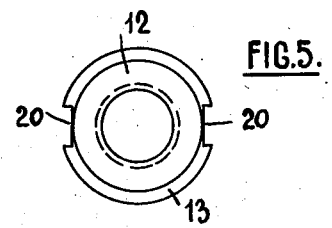

Patented Sept. 12, 1939

2,172,350

UNITED STATES PATENT OFFICE 2,172,350

SCREW CONNECTION

Willi Heyner and Hermann Henkel, Berlin-Neukolln, Germany

Application November 15, 1938, Serial No. 240,470
In Germany April 21, 1938

1 Claim. (Cl. 85—2.4)

Our invention relates to screw connections serving to enable thin plates, for instance plywood sheets, sheets of linoleum and other composite material, leather and the like, to be connected with other parts by screwing.

In our copending application for Letters Patent of the United States Serial No. 168,041 filed October 8, 1937, we have described a screw connection consisting of two parts, an internally threaded female part or nut and a sleeve adapted to be fixed, by interaction with that female part, in a hole or perforation of the plate or sheet and in its turn to retain the female part therein.

In the drawing affixed to this specification and forming part thereof we have illustrated diagrammatically by way of example an embodiment of a screw connection according to our invention and of a tool serving to fix the parts in place.

In the drawing:

Fig. 1 is an axial section of the screw connection and the tool in the position of the parts, in which the tool is prepared for the fixing of the screw connection in a wooden plate.

Fig. 2 is a similar view showing the parts in the position after the screw connection has been fixed in the plate.

Fig. 3 is an enlarged view of the outer part or sleeve of the screw connection and a tool serving to expand the edge portion thereof, while Fig. 4 is a plan view of a modified form of the inner part or nut, Fig. 5 a similar view of the outer part or sleeve after fixation in the wood and Fig. 6 an axial section showing the two parts of the screw connection fixed in a wooden plate.

Referring to the drawing and first to Figs. 1 to 3, 14 is a metal sleeve formed at one end with a thin edged part 15. 12 is a nut formed at one end with a flange 13 and fitting in the sleeve 14. When a conical tool such as 22 (Fig. 3) is forced into the sleeve 14 from the thin edged part 15, this part will be expanded, being subdivided into a number of separate tongues. If the sleeve is now placed on the nut 12 with the thin expanded part 15 facing the flange 13 and axial pressure is exerted on the sleeve 14, the tongues will be spread by the wedge action of the flange 13 and will enter the wood or other material, in which the parts are seated.

In order to fix the parts in place, they are placed in an excavation of the sheet of wood, linoleum, leather or the like and the tool shown in Figs. 1 and 2 is mounted above them. This tool is formed of a strong hollow metal cylinder 1 closed on top and formed with a broad flange 16 at the bottom, which is designed to distribute the pressure on a large surface of the wood, leather or the like. Above the cylinder 1 is mounted another cylinder 4 formed with a head 3 and seated in a cylinder 2 with perforated bottom. Through the perforations of this bottom and the cover of cylinder 1 extend four steel pins 5, which carry the bottom edge of the cylinder 4 and rest on another cylinder 9 seated in the cylinder 1 for axial movement, which is limited by a pin 11 forming a check and extending into an axial groove 10 of cylinder 9. Into the cylinder 9 extends a bolt 6 seated in a central hole in the cover of cylinder 1 and retained therein by a top flange 18. An extension 7 of the bolt 6 is formed at its bottom end with screw threading 8 which fits in the screw threading of the nut 12.

In order to fix the parts 12 and 14 in place in the wood, linoleum or the like, the nut 12 carrying the sleeve 14 is screwed onto the threaded end 8 of the bolt extension 7 and the tool 1, 2 is placed on top of the cavity serving to receive the parts 12, 14, which now extend into this cavity, as shown in Fig. 1. By a blow of the hammer striking the head 3, the pins 5 will force the cylinder 9 downwardly and the bottom face of this cylinder, resting on the sleeve 14, will force the sleeve downwardly, whereby the tongues forming part of the thin edged portion of sleeve 14 are spread in gliding on the flange 13, being thus driven into the wall of the excavation, as shown in Fig. 2. These tongues now firmly fix the nut 12 in position in this excavation.

In order to prevent the combined parts of the screw connection from turning in this excavation, we prefer forming the flange 13 of the sleeve 12 with two opposite notches 20, each notch being so dimensioned as to allow one of the tongues to pass through without being forced aside. Consequently, when the sleeve is driven down, two tongues 21 will enter the material of the plate or the like below the excavation 25 as shown in Figs. 5 and 6, while the other tongues 15a are spread sideways as shown in Fig. 4. The nut 12 is now prevented from turning in the sleeve by the tongues 21 which extend into the notches 20 of the nut.

We wish it to be understood that we do not desire to be limited to the exact details of construction shown and described for obvious modifications will occur to a person skilled in the art.

We claim:

A screw connection adapted to be fixed in thin plates of soft material comprising in combination, an internally threaded tubular sleeve forming a nut, a flange at one end of said tubular sleeve formed with a cam face and an outer tubular sleeve snugly fitting said nut and formed at one end with a thin edged slitted annular portion adapted to be expanded, when it is forced axially onto the cam faced flange, the flange on the nut being formed with a notch enabling part of the thin-edged slitted portion of the outer sleeve to escape deformation when the sleeve is forced down upon said flange.

WILLI HEYNER.
HERMANN HENKEL.